(12) United States Patent
Hyodo

(10) Patent No.: US 8,422,880 B2
(45) Date of Patent: Apr. 16, 2013

(54) FILTER ADAPTER

(75) Inventor: Yoshimasa Hyodo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 13/194,615

(22) Filed: Jul. 29, 2011

(65) Prior Publication Data
US 2012/0033962 A1 Feb. 9, 2012

(30) Foreign Application Priority Data
Aug. 6, 2010 (JP) ................................ 2010-177505

(51) Int. Cl.
*G03B 11/00* (2006.01)
(52) U.S. Cl.
USPC ........................................... 396/544; 348/360
(58) Field of Classification Search .................. 396/544; 348/360
See application file for complete search history.

(56) References Cited

U.S. PATENT DOCUMENTS

| 5,208,624 | A | * | 5/1993 | MacKay | 396/544 |
| 2011/0164869 | A1 | * | 7/2011 | Kudoh | 396/349 |
| 2012/0268648 | A1 | * | 10/2012 | Yang | 348/360 |

FOREIGN PATENT DOCUMENTS

JP 2007-212971 A 8/2007

* cited by examiner

*Primary Examiner* — Clayton E Laballe
*Assistant Examiner* — Dennis Hancock
(74) *Attorney, Agent, or Firm* — Canon USA Inc IP Division

(57) ABSTRACT

A filter adapter includes a stationary tube detachably mountable on a camera body in a state that it is externally fitted on a zoom lens barrel, a movable tube movably arranged in an optical axis direction with respect to the stationary tube and including a lens barrel pressing portion extending inwardly in a radial direction at a top end portion of the movable tube, to which an optical filter is detachably attached at an end portion of an object side of the lens barrel pressing portion, and an urging member configured to urge the movable tube toward the camera body. When the lens barrel extends to the object side, the lens barrel pressing portion is pressed against an urging force of the urging member by the top end portion of the lens barrel, the movable tube moves in an optical axis direction in conjunction with the lens barrel.

7 Claims, 8 Drawing Sheets

FILTER ADAPTER

BACKGROUND OF THE INVENTION

1. Field of the Invention

The present invention relates to a filter adapter configured to be detachably mounted on a camera body of, for example, a digital camera in a state that the filter adapter is externally fitted on a zoom lens barrel. The filter adapter is detachably provided with an optical filter on an end portion of the filter adapter at an object side.

2. Description of the Related Art

In a single-lens reflex camera, an inner circumferential portion of a top end portion of a zoom lens barrel is provided with a female screw portion formed thereon and an optical filter is screwed onto the female screw portion in a detachable manner.

Japanese Patent Application Laid-open No. 2007-212971 discusses an adapter ring detachably mounted on a camera body in a state that the adapter ring is externally fitted on the zoom lens barrel and a technique that an optical filter is detachably mounted on a top end portion of the adapter ring.

The adapter ring includes a mask for preventing an inner reflection inside a protection tube such that the mask is movable in an optical axis direction. The mask is pressed in a direction in which the mask contacts a top end portion of a lens barrel (i.e., toward the camera body) by a coil spring. When the lens barrel is extended to a photographing position, the top end portion of the lens barrel contacts the mask and, in this state, the lens barrel moves in an optical axis direction toward an object side against the pressure force of the coil spring.

However, in a case where an optical filter is screwed onto a female screw portion formed on the inner circumferential portion of the top end portion of a zoom lens barrel of a single-lens reflex camera, if the optimum filter diameter that does not block a photographing optical path is set, only the top end portion of the lens barrel has a large diameter, so that the lens barrel itself becomes large in size.

On the other hand, in Japanese Patent Application Laid-open No. 2007-212971, the lens barrel itself can be prevented from becoming large in size since the optical filter is mounted on the top end portion of the adapter ring, which is externally fitted on the lens barrel. However, in Japanese Patent Application Laid-open No. 2007-212971, since a protection tube is externally fitted over the entire range of the lens barrel in a state that the lens barrel is most extended (i.e., in a telephoto state), a length in the optical axis direction becomes longer when the adapter ring is mounted on the camera body. The length in the optical axis direction does not change even when the lens barrel is retracted, so that there is an issue in portability of the camera.

SUMMARY OF THE INVENTION

According to an aspect of the present invention, a filter adapter configured to be mounted on a camera body including a zoom lens barrel includes a stationary tube including a mounting portion configured to be detachably mounted on the camera body, a movable tube configured to be movably arranged in an optical axis direction with respect to the stationary tube, the movable tube including a lens barrel pressing portion extending inwardly in a radial direction at a top end portion of the movable tube and an attachment portion to which an optical filter is detachably mounted on an end portion of an object side of the lens barrel pressing portion, and an urging member positioned between the stationary tube and the movable tube and configured to urge the movable tube toward the stationary tube, wherein the filter adapter is mounted on the camera body such that the stationary tube covers the lens barrel and, when the lens barrel is extended to the object side, the lens barrel pressing portion presses a top end portion of the lens barrel according to an urging force of the urging member, so that the movable tube moves in an optical axis direction in conjunction with the lens barrel and a length of the filter adapter in an axis direction changes.

According to an exemplary embodiment of the present invention, an optical filter having the optimum filter diameter can be mounted on a lens barrel without causing an increase in size of the lens barrel itself. Since a length of a filter adapter mounted on a camera body in an optical axis direction can be made shorter when the lens barrel is retracted, excellent portability can be obtained.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
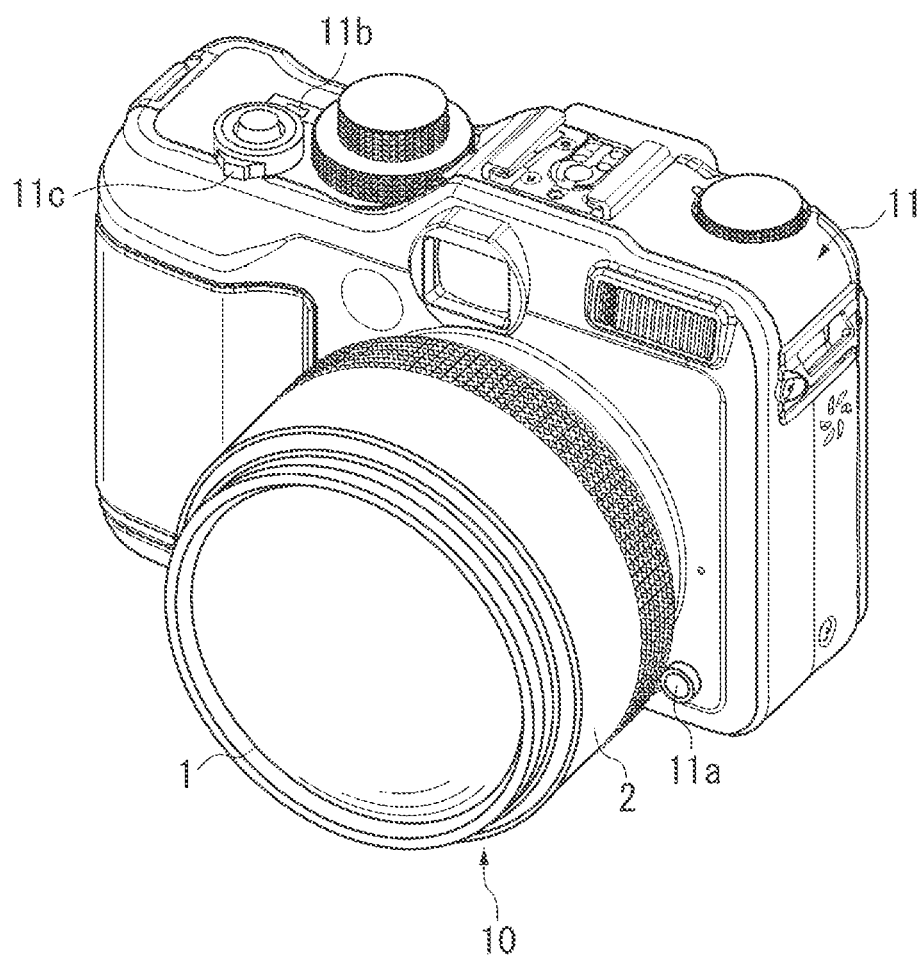
FIG. 1 is a perspective view illustrating a state that a filter adapter according to an exemplary embodiment of the present invention is mounted on a camera body of a digital camera.
Figure 2:
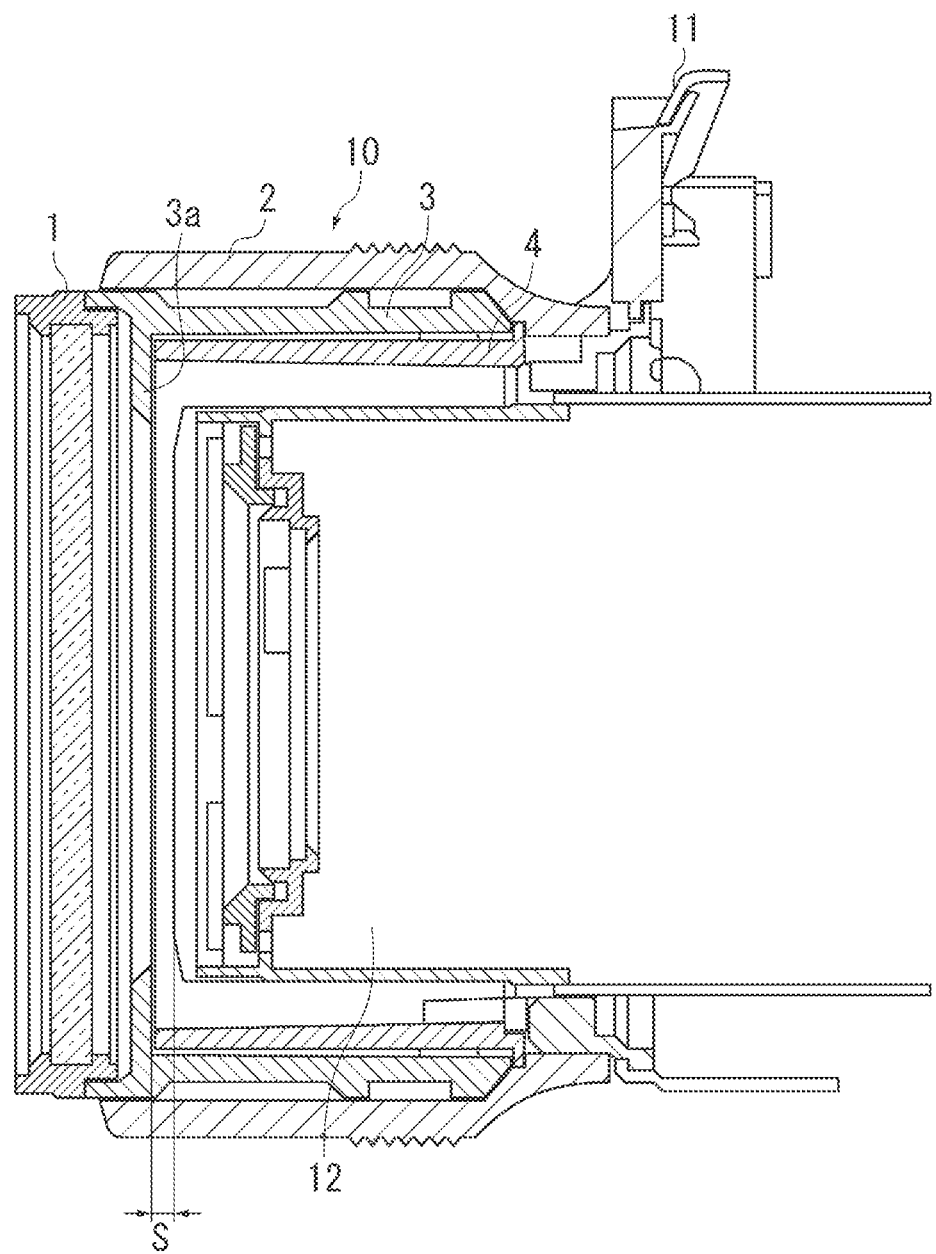
FIG. 2 is a cross sectional view of a main section of the filter adapter illustrated in FIG. 1.
Figure 3:
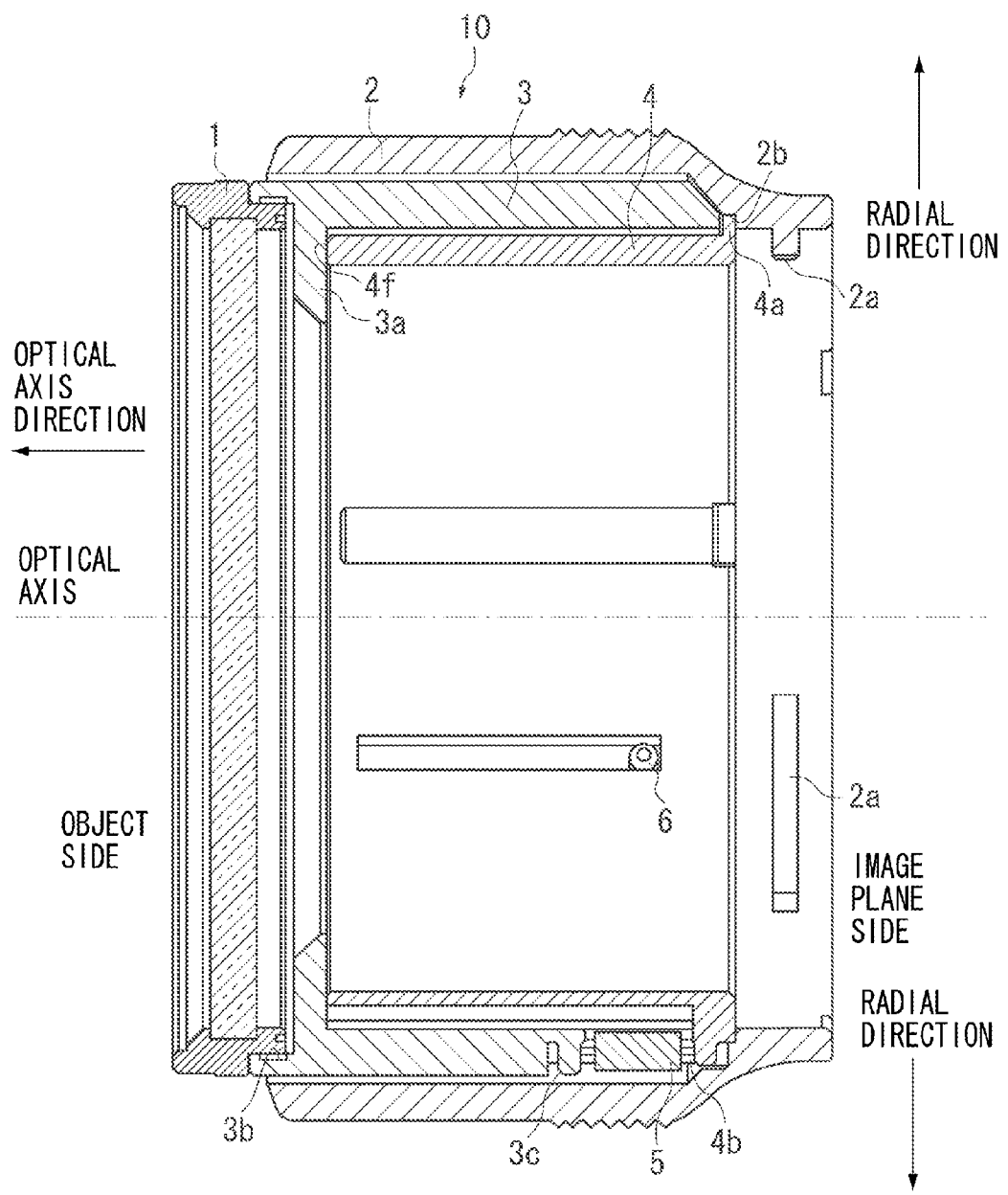
FIG. 3 is a cross sectional view along with an axis direction of the filter adapter.
Figure 4:
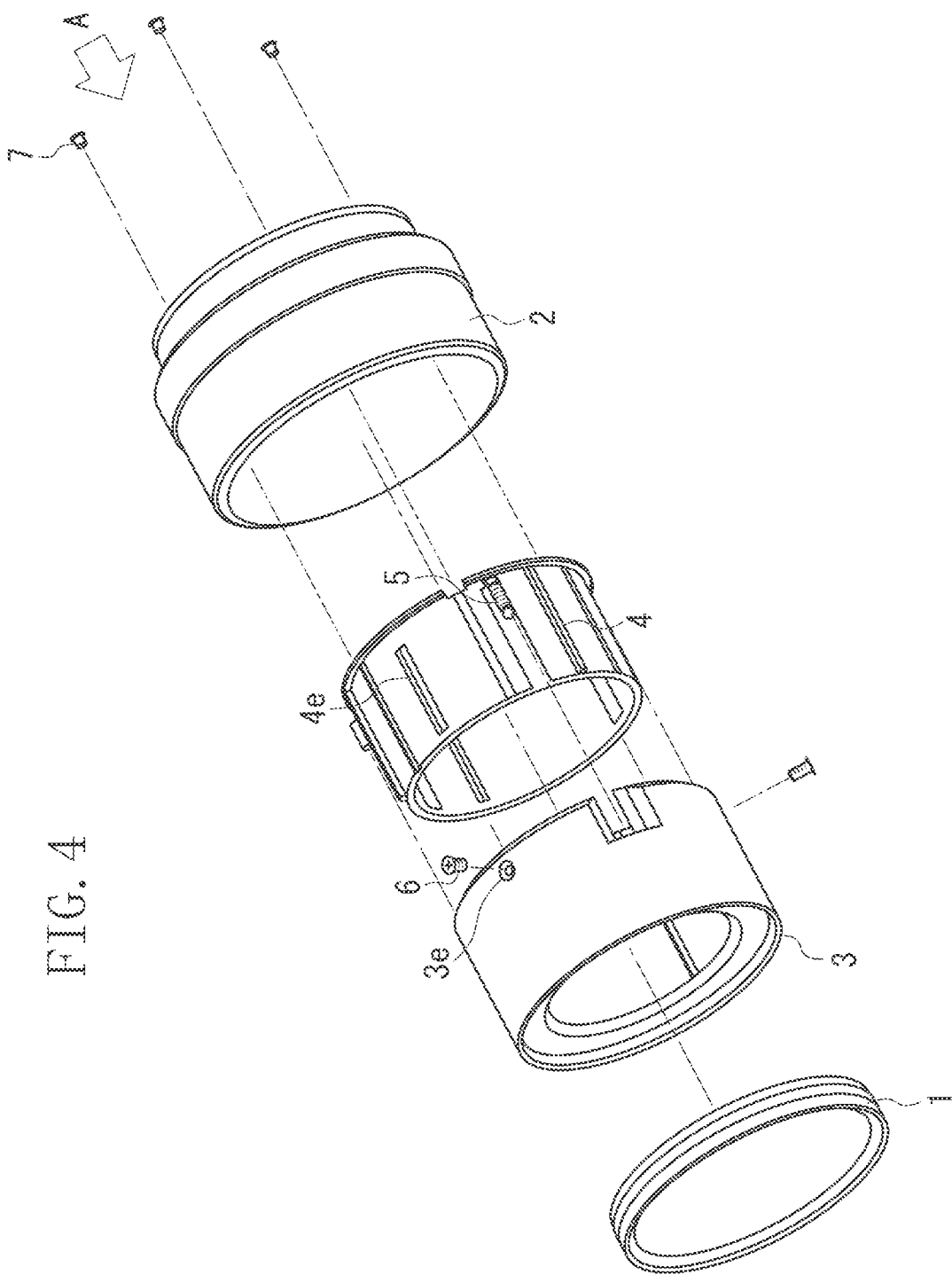
FIG. 4 is an exploded perspective view of the filter adapter illustrated in FIG. 3.
Figure 5:
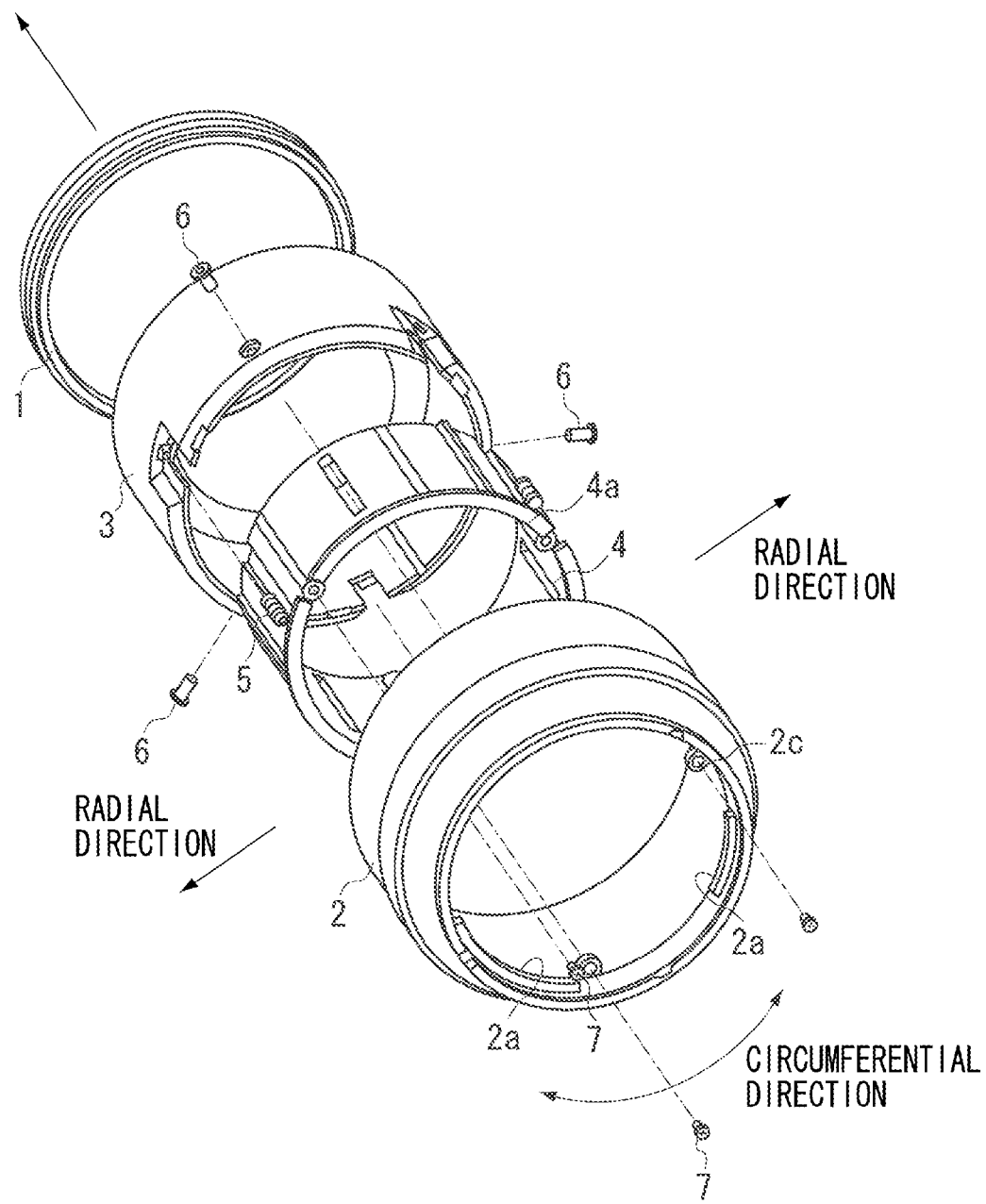
FIG. 5 is an exploded perspective view of the filter adapter as viewed from an arrow A direction in FIG. 4.
Figure 6:
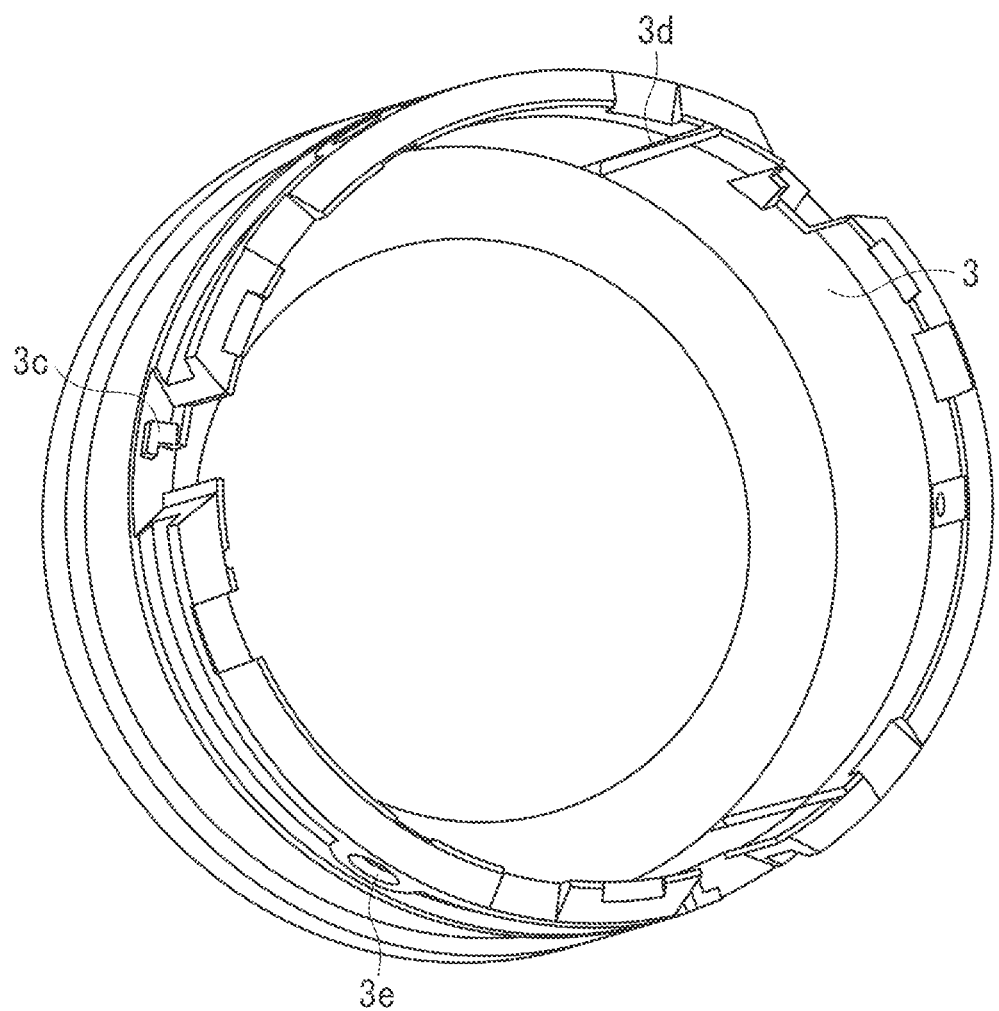
FIG. 6 is a perspective view of a movable tube.
Figure 7:
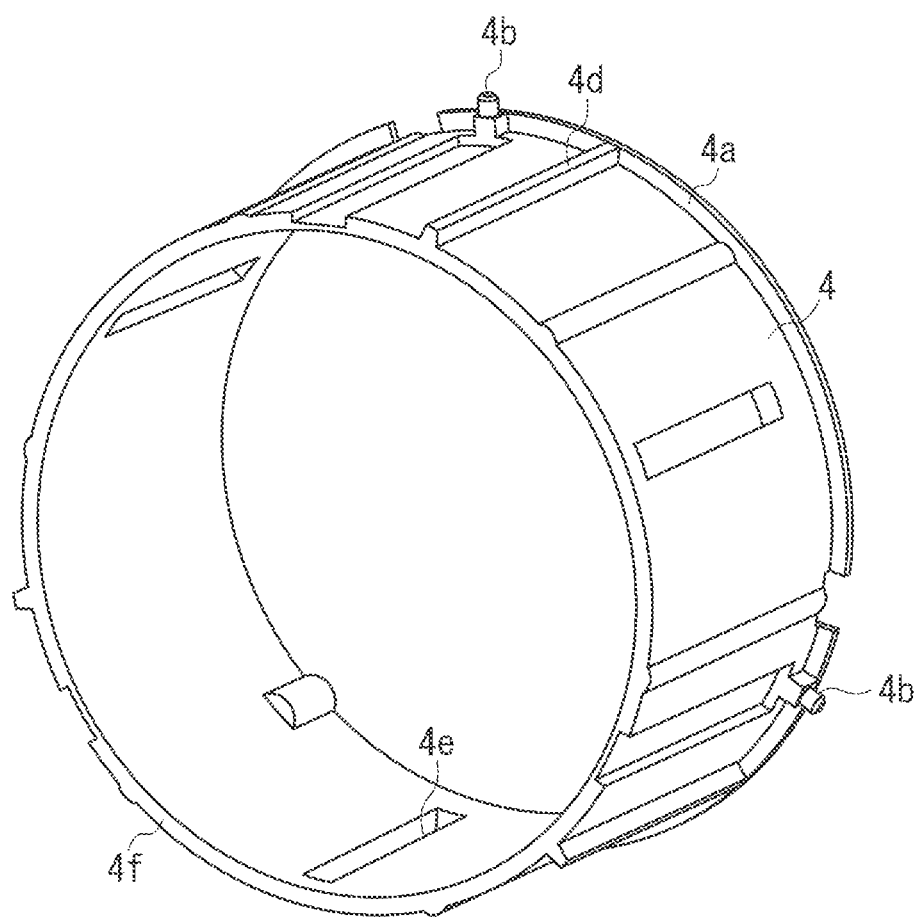
FIG. 7 is a perspective view of a base tube.

FIG. 1 is a perspective view illustrating a state that a filter adapter according to an exemplary embodiment of the present invention is mounted on a camera body of a digital camera. FIG. 2 is a cross sectional view of a main section of the filter adapter illustrated in FIG. 1. FIG. 3 is a cross sectional view along with an axis direction of the filter adapter. FIG. 4 is an exploded perspective view of the filter adapter illustrated in FIG. 3. FIG. 5 is an exploded perspective view of the filter adapter as viewed from an arrow A direction in FIG. 4. FIG. 6 is a perspective view of a movable tube. FIG. 7 is a perspective view of a base tube.

As illustrated in FIGS. 1 and 2, a filter adapter 10 of the present exemplary embodiment is detachably mounted on a camera body 11 via bayonet portions 2a (see FIG. 3) in a state that the filter adapter 10 is externally fitted on a zoom lens barrel 12 of a digital camera. The bayonet portions 2a constitute an example of a mounting portion. A lens barrel 12 extends from a retracted position to a wide-angle position (see FIG. 2) when a power switch 11b of a camera body 11 turned on, and the lens barrel 12 performs a zooming operation toward a telephoto position when a zoom lever 11c of the camera body 11 is operated.

The filter adapter 10 includes, as illustrated in FIGS. 2 and 3, a base tube 4, a movable tube 3 arranged on an outer circumferential side of the base tube 4, and an outer tube 2 arranged on an outer circumferential side of the movable tube 3. The movable tube 3 moves in a telescopic fashion relative to the outer tube 2 and the base tube 4. The base tube 4 may also be referred to as the inner tube 4. In an inner circumferential portion of a base end side (i.e., a side of the camera body 11) of the outer tube 2, a plurality of bayonet portions 2a for detachably mounting the filer adapter 10 on the camera body 11 is provided and are substantially equally spaced relative to each other in a circumferential direction of the outer tube 2. The filter adapter 10 can be detached from the camera body 11 when an attachment/detachment button 11a of the camera body 11 is operated.

A recessed portion 2b is formed at a position of a slightly top end side (i.e., an object side) of the bayonet portions 2a of the inner circumferential portion of the outer tube 2. A raised portion 4a projecting externally in a radial direction is formed on the outer circumferential portion of the base end side of the base tube 4 and is to be engaged with the recessed portion 2b. As illustrated in FIGS. 4 and 5, a plurality of screws 7 is provided, which are screwed into screw insertion holes 2c, respectively. Screw insertion holes 2c are substantially equally spaced relative to each other in the circumferential direction on the base end side of the outer tube 2 and screws 7 are further screwed into the raised portion 4a. As a result, the base tube 4 is integrally fixed to the outer tube 2. The outer tube 2 and the base tube 4 each constitute an example of a stationary tube.

The movable tube 3 is movably arranged in an optical axis direction between the outer tube 2 and the base tube 4. A plurality of rectilinear motion grooves 3d extending in the optical axis direction is formed, as illustrated in FIG. 6, substantially equally spaced relative to each other in the circumferential direction on the inner circumferential portion of the movable tube 3. A plurality of screw holes 3e is formed substantially equally spaced relative to each other in the circumferential direction in the outer circumferential portion of the base end side of the movable tube 3.

On the other hand, as illustrated in FIG. 7, a plurality of rectilinear motion keys 4d extending in the optical axis direction is formed substantially equally spaced relative to each other in the circumferential direction on the outer circumferential portion of the base tube 4 with respect to the respective rectilinear motion grooves 3d of the movable tube 3. The rectilinear motion grooves 3d of the movable tube 3 can engage with the corresponding rectilinear motion keys 4d of the base tube 4, so that the movable tube 3 is arranged to be relatively movable with respect to the base tube 4 in the optical axis direction.

A plurality of through holes 4e, or slots 4e, extending in the optical axis direction is formed substantially equally spaced relative to each other in the circumferential direction with respect to the respective screw holes 3e of the movable tube 3. As illustrated in FIGS. 4 and 5, leading ends of screws 6 screwed from the outer circumferential side into the screw holes 3e of the movable tube 3 are inserted into the corresponding through holes 4e of the base tube 4. Accordingly, when the movable tube 3 moves in the optical axis direction by a predetermined amount toward the object side with respect to the base tube 4, the movable tube 3 is prevented from falling down, or disengaging, from the base tube 4. This is because the leading ends of the screws 6 contact inner end walls of the object side of the through holes 4e.

As illustrated in FIGS. 3 and 6, a plurality of dowels 3c is provided substantially equally spaced relative to each other in the circumferential direction on the movable tube 3. As illustrated in FIGS. 3 and 7, a plurality of dowels 4b is provided substantially equally spaced to each other in the circumferential direction on the base tube 4. Each of ends of the respective tension coil springs 5 may press or urge the movable tube 3 onto, or toward, the side of the camera body 11 and is retained to each of the dowel 3c and dowel 4b. The tension coil springs 5 constitute an example of an urging member. The inner circumferential portion of the top end side of the movable tube 3 is provided with a lens barrel pressing portion 3a extending inwardly in the radial direction. The lens barrel pressing portion 3a may be arranged near a distal end of the movable tube 3, wherein the distal end is understood by the skilled artisan to be the end of the movable tube farthest from the camera body 11.

Before the lens barrel 12 extends, at least from a retracted position to a wide-angle position, the lens barrel pressing portion 3a is configured to contact a top end portion 4f of the base tube 4 while it is pressed toward the camera body 11 by the tension coil springs 5.

The top end portion of the movable tube 3 projects, as illustrated in FIG. 3, toward the object side more than the lens barrel pressing portion 3a. A female screw portion 3b, or threaded portion 3b, is formed on the inner circumferential portion of the projecting portion of the movable tube 3. An optical filter 1, e.g., an ISO standard lens filter, is detachably screwed to the female screw portion 3b of the movable tube 3. The female screw portion 3b constitutes an example of an attachment portion.

When the power switch 11b of the camera body 11 is turned on, the lens barrel 12 extends from the retracted position to the wide-angle position as illustrated in FIG. 2. The filter adapter 10 at the time comes to be a state illustrated in FIG. 1. In a state that the lens barrel 12 extends to the wide-angle position, the top end portion of the lens barrel 12 does not contact the lens barrel pressing portion 3a of the movable tube 3 but is arranged at the side of the camera body 11 spaced from the lens barrel pressing portion 3a by a distance S. Even if there is an assembly accuracy error between the camera body 11 and the lens barrel 12, by providing the distance S, the top end portion of the lens barrel 12 does not contact with the lens barrel pressing portion 3a of the movable tube 3 for sure. If the top end portion of the lens barrel 12 always contact with the lens barrel pressing portion 3a in a state that the lens barrel 12 extends to the wide-angle position, the lens barrel 12 is applied too much load.

When the zoom lever 11c of the camera body 11 is operated toward a telephoto side, the lens barrel 12 moves to a telephoto position from the wide-angle position to cause the top end portion of the lens barrel 12 to contact the lens barrel pressing portion 3a of the movable tube 3. In the above-described state, when the lens barrel 12 moves toward the telephoto position, while pressing the lens barrel pressing portion 3a against the pressing force of the tension coil springs 5, the movable tube 3 moves in the optical axis direction toward the object side with respect to the outer tube 2 and the base tube 4.

Figure 8:
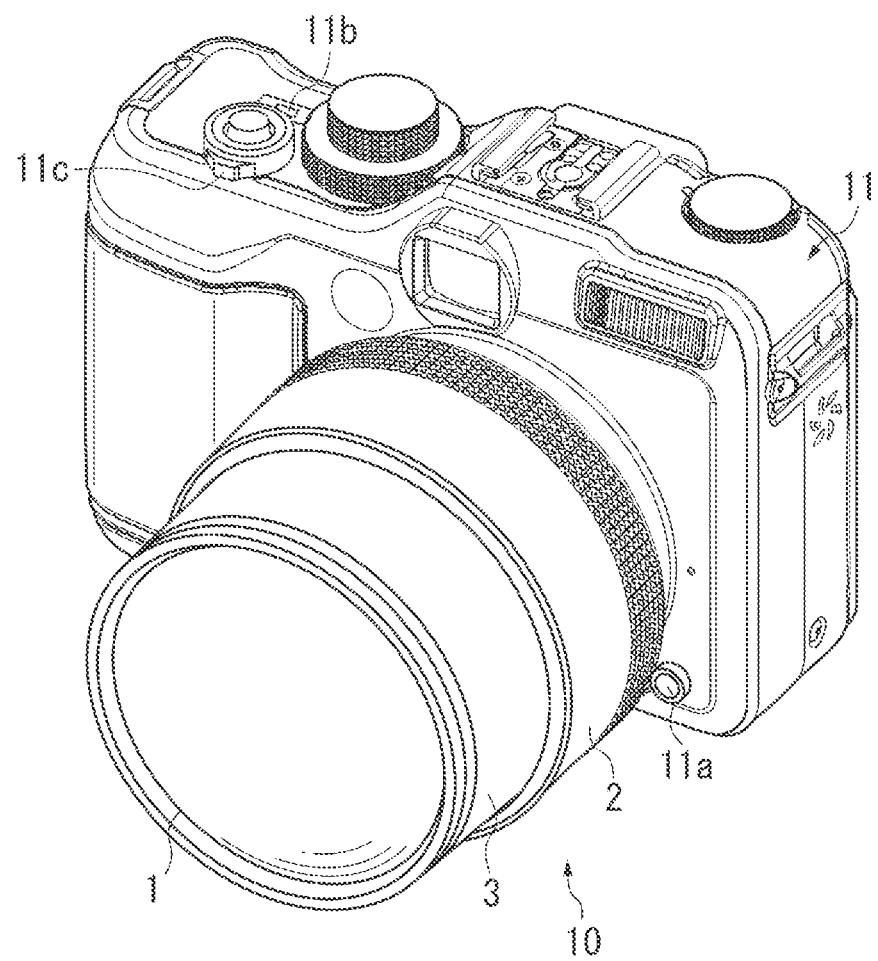
FIG. 8 is a perspective view illustrating a state of the filter adapter when a lens barrel reaches a telephoto position.

When the user removes their hand from the zoom lever 11c at a desirable photographing angle, the lens barrel 12 stops and the movable tube 3 also stops such that the lens barrel pressing portion 3a is pressed against the top end portion of the lens barrel 12 by the pressing force of the tension coil springs 5. FIG. 8 is a perspective view illustrating a state of the filter adapter 10 when the lens barrel 12 reaches the telephoto position. As understood from FIG. 8, the movable tube 3 of the filter adapter 10 has moved toward the object side with respect to the outer tube 2 and the base tube 4.

In a case where the zoom lever 11c of the camera body 11 is operated toward the wide-angle side or in a case where the power switch 11b is turned off in the state illustrated in FIG. 8, the movable tube 3 also moves toward the camera body 11 in conjunction with the retracting operation of the lens barrel 12. At the time, the movable tube 3 moves toward the camera body 11 according to the pressing force of the tension coil springs 5 until the lens barrel pressing portion 3a contacts the top end portion of the base tube 4 while it is pressed against the top end portion of the lens barrel 12, thereby coming to be the state illustrated in FIG. 1.

As described above, in the present exemplary embodiment, the optical filter 1 is attached to the top end portion of the filter adapter 10, which is configured to be detachably mounted on the camera body 11 in a state that the filter adapter 10 is externally fitted on the lens barrel 12. Accordingly, without causing an increase in size of the lens barrel 12, the optical filter 1 having the optimum filter diameter can be attached.

When the lens barrel 12 is retracted, since the length of the filter adapter 10 mounted on the camera body 11 in the optical axis direction can be made shorter than the length thereof in a case of the telephoto-state, a digital camera having excellent portability can be made.

Further, since the movable tube 3 moves while the lens barrel pressing portion 3a tightly contacts the top end portion of the lens barrel 12 in almost the entire region of a range from the wide-angle position to the telephoto position of the lens barrel 12, a ghost (i.e., a light beam unnecessary for photographing enters into the lens barrel 12) is diffused and can be prevented from occurring.

The configuration of the present invention is not limited to the above described exemplary embodiment. A material, a shape, a size, a dimension, a number, and an arrangement position are changeable as required, without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-177505 filed Aug. 6, 2010, which is hereby incorporated by reference herein in its entirety.

What is claimed is:

1. A filter adapter configured to be mounted on a camera body including a zoom lens barrel, the filter adapter comprising:
   a stationary tube including a mounting portion configured to be detachably mounted on the camera body;
   a movable tube configured to be movably arranged in an optical axis direction with respect to the stationary tube, the movable tube including a lens barrel pressing portion extending inwardly in a radial direction at a top end portion of the movable tube and an attachment portion to which an optical filter is detachably mounted on an end portion of an object side of the lens barrel pressing portion; and
   an urging member positioned between the stationary tube and the movable tube and configured to urge the movable tube toward the stationary tube;
   wherein the filter adapter is mounted on the camera body such that the stationary tube covers the zoom lens barrel and, when the zoom lens barrel is extended to the object side, the lens barrel pressing portion presses a top end portion of the zoom lens barrel according to an urging force of the urging member, so that the movable tube moves in an optical axis direction in conjunction with the zoom lens barrel and a length of the filter adapter in an axis direction changes.

2. The filter adapter according to claim 1, wherein, when the zoom lens barrel extends to a wide-angle position, the lens barrel pressing portion of the movable tube contacts the stationary tube at a position where the top end portion of the zoom lens barrel does not contact the lens barrel pressing portion.

3. A filter adapter surrounding a portion of a zoom lens barrel, the filter adapter comprising:
   an outer tube;
   a movable tube having a lens barrel pressing portion arranged toward a distal end of the movable tube, the movable tube arranged interior to the outer tube and able to move linearly and telescopically relative to the outer tube;
   an inner tube arranged interior to the movable tube, the inner tube attached to the outer tube and remaining stationary relative to the outer tube;
   at least one urging member attached to the movable tube and either the outer tube or the inner tube;
   wherein when the zoom lens barrel is extended and in a telephoto state, a top end portion of the zoom lens barrel contacts the lens barrel pressing portion causing the movable tube to extend in an optical axis direction and away from a camera body.

4. The filter adapter as claimed in claim 3, wherein when the zoom lens barrel is retracted and in a wide-angle position, the movable tube is retracted and moves toward the camera body.

5. The filter adapter as claimed in claim 4, wherein the at least one urging member provides a tensile force on the movable tube when the zoom lens barrel is in the telephoto state.

6. The filter adapter as claimed in claim 3, wherein the urging member is a plurality of urging members.

7. The filter adapter as claimed in claim 6, wherein the urging member is a spring.

* * * * *